Sept. 14, 1965  R. OLLIS, JR., ETAL  3,205,756
THREAD SYSTEM
Filed Dec. 31, 1962

INVENTORS
RAYMOND OLLIS Jr.
& RICHARD A. WALKER
BY
Synnestvedt + Lechner
ATTORNEYS United States Patent Office 3,205,756
Patented Sept. 14, 1965

3,205,756
THREAD SYSTEM
Raymond Ollis, Jr., Oreland, and Richard A. Walker, Philadelphia, Pa., assignors to Standard Pressed Steel Co., Jenkintown, Pa., a corporation of Pennsylvania
Filed Dec. 31, 1962, Ser. No. 248,716
8 Claims. (Cl. 85—1)

This invention relates to a thread system—especially as it is embodied in nuts and bolts—which will increase the fatigue life of external threads engaged by internally threaded members.

Another aspect of the invention relates to a special nut configuration which when used in conjunction with the thread system of this invention still further serves to increase the fatigue life of the external threads engaged by the nut.

As used herein, the term "thread system" is intended to refer to all types of combinations of internal and external screw thread arrangements which employ ridges of uniform section in the form of a helix on the external and on the internal surfaces of a cylinder or frustum of a cone. However, we will generally describe the invention in terms of its application to thread system in the form of nuts and bolts and particularly in terms of single start, straight threads having 60° thread forms.

When bolts and similar externally threaded members are engaged by a nut or similar internally threaded member and the system is dynamically loaded, fatigue failures of the bolt will usually result from the stress concentrations at the roots of certain external threads.

FIG. 1 depicts schematically a typical distribution pattern of the stresses of an axially stressed nut and bolt combination. A stress concentration exists in the "bottom" (i.e., the threads nearest the bearing face of the nut) threads of the nut and in the adjacent engaged external threads. The vast majority of bolt fatigue failures occur in the vicinity the threads which are being subjected the greatest concentration of stresses.

FIG. 2 depicts schematically the stress distribution pattern of an "ideal" nut and bolt combination when under axial stress and each engaged thread carries an equal portion of the load.

The closer the pattern of stress concentrations can be made to conform to that of the "ideal" nut and bolt combination of FIG. 2, the longer will be the fatigue life of the fastener combination.

Hence, it is an object of this invention to provide a thread system that will distribute the stress concentrations more uniformly on the engaged threads.

It is another object of this invention to provide a special internal configuration for a nut which when used in conjunction with the thread system of this invention will serve to further increase the fatigue life of the associated externally threaded member by distributing the stress concentrations on the engaged threads more uniformly than is the case where the unique thread system of this invention alone is used.

Other objects and advantages of this invention will be apparent from the ensuing description.

These objects and advantages are obtained in accordance with this invention by a thread system including an internally threaded member and an externally threaded member, the internal threads having, when in an unloaded condition, a progressively longer lead than the lead of the unloaded external threads, the lead differential being sufficient to compensate for the shortening of the lead of the internal threads and the elongation of the external threads which occurs on loading of the thread system and thereby provide for a more uniform distribution of the stress concentrations at the roots of the engaged external threads and wherein said lead differential is insufficient to cause the unloaded system to have an intereference fit.

In accordance with other aspects of this invention, the objects and advantages are achieved by employing a nut whose threads have the progressively long lead as hereinabove set forth and further characterized in that the nut is axially counterbored for a depth of from one to four threads at the bearing face and in the general vicinity of the pitch diameter.

To assist in understanding the present invention, reference is made to the drawings in which.

Throughout the specification, the following symbols are used to indicate:

$E$ = the modulus of elasticity of the nut material in pounds per square inch.
$n$ = the number of threads to carry the load (i.e., the engaged threads).
$n_o$ = number of threads per inch
$p = 1/n_o$
$F_T$ = total tensile load in pounds
$A_B$ = external thread cross sectional area (square inches)
$A_N$ = average cross sectional area of the material surrounding the internal threads (square inches)
$\Delta PN$ = change in pitch length of the nut in inches
$\Delta P_B$ = change in pitch length of the bolt in inches
$\Delta L$ = total change of combination in pitch length in inches
$Le$ = inches of lead differential between nut and bolt per inch of thread engagement.
$PD_B$ = basic pitch diameter of the bolt in inches assuming perfect thread form and configuration; and where $Le=0$ it will be both the true and the virtual pitch diameter.
$PD_N$ = true pitch diameter of the nut in inches assuming perfect thread form and configuration; and where $Le=0$ it will be the virtual pitch diameter.
$\Delta PD$ = change in true pitch diameter in inches to compensate for lead corrections.
$H_T$ = nut height in inches
$S_N$ = stress on nut
$S_B$ = stress on bolt.

When a thread system such as a nut and bolt combination is loaded, the nut is in compression and its height is lessened as is the distance between its threads (i.e., both the pitch and the lead will be shortened). On the other hand, loading the system applies forces to the bolt which, absent the restraining influence of the nut would tend to elongate the bolt and also the distance between its threads. The elongative and compressive forces acting on the nut and bolt force the bottom threads of the nut to carry the greatest portion of the load (in some cases the bottom two threads carry as much as one-half the entire load) and this in turn induces early fatigue failure.

Figure 1:
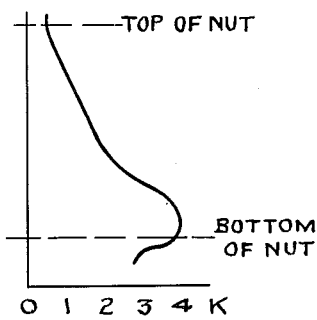
FIG. 1 is a schematic representation of the stress concentrations of a conventional axially loaded thread system.
Figure 2:
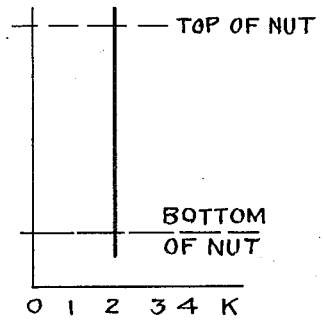
FIG. 2 is a schematic representation of the pattern of stress concentrations of an "ideal" nut and bolt arrangement.

In the ideal stress distribution pattern of FIG. 2 each thread carries its proportionate share of the load. If the load is to be evenly distributed some means must be provided to compensate for the relative changes in the pitch of the internal and external threads which occurs on loading. As was previously noted, when a load is applied to a nut and bolt, the force is such that there is a tendency for the bolt pitch to elongate and the nut pitch to compress. Therefore, in order for the load to be evenly distributed over the threads, the pitch of both the internal and external threads should be equal just before each thread starts to carry its share of the load. In other words, for an evenly distributed load, each thread should carry $F_T/n$ and as the load is applied increments equal to $F_T/n$, the clearance between the next mating threads should be equal to the strain produced by the increment $F_T/n$ or $$\Delta P = \frac{F_T P}{nAE}$$

however because the forces acting on the internal and external threads have a tendency to move under axial loads so that the clearance between mating threads would have to be equal to $\Delta P_N + \Delta P_B$ where $$\Delta P_N = \frac{F_T P}{A_N E}$$

for the internal threads and $$\Delta P_B = \frac{F_T P}{A_B E}$$

for the external threads.

To compensate for the movement, the pitch correction for an individual thread would have to be equal to the pitch of the bolt plus the change in pitch of the internal and external threads caused by the addition of the external load divided by the number of threads that must support the load. A lead or pitch correction may be made by either shortening the external thread pitch or lengthening the pitch of the internal thread or applying a correction to both threads.

The lead correction in a nut therefor compensates for the differential strain produced in the nut-bolt combination under axial load. Since the strain is proportional to the stress each stress level of fastener combination may require a different amount of lead correction, the optimum lead correction can be determined from the following formulae:

(1) $$Le = \frac{n_o}{n}(\Delta L)$$

(2) $$\Delta L = n(n-1)(\Delta P_N + \Delta P_B)$$

(3) $$\Delta P_N = \frac{F_T P}{n A_N E}$$

(4) $$\Delta P_B = \frac{F_T P}{n A_B E}$$

It is preferred that the lead correction be a running or progressive lead differential characterized by a steadily increase deviation in each successive turn of thread.

In those cases where the cross sectional areas ($A_N$ and $A_B$) of the internal and external threads are substantially equal, the optimum lead correction or differential can be determined from the following formula:

(5) $$Le = \frac{2(n-1)F_T}{nAE}$$

To illustrate the application of Formula 5 in computing an optimum lead correction for a situation in which the tensile forces are to be 10,000 lbs.; 11 threads are to carry the load; $A_N$ and $A_B$ are each equal to 0.0878 square inch and the modulus of elasticity of the nut is $30 \times 10^6$:

$$Le = \frac{2(11-1)10,000}{11(0.0878)30} \times 10^6 = 0.0069''$$

Generally, in the case of steel nuts and bolts where the combination is intended to be used under tensile loads of 200,000 p.s.i. and greater lead corrections or differential between the nut and bolt generally run the order of 0.005 to 0.007 inch per inch between the nut and bolt and the internal threads should have the longer lead.

In addition, the lead differential should not be sufficiently large as to cause the unloaded system to have an interference fit. If the lead correction is so large as to cause an interference fit, it is necessary to also change the true pitch diameter of the lead corrected threads to compensate for the change in virtual pitch diameter which results from the lead differential. The change in true pitch diameter ($\Delta PD$) for 60° thread forms can be computed from the following formula:

$$\Delta PD = 1.732 \times Le \times H_T$$

The $\Delta PD$ correction will be (+) for internal threads and (−) for external threads, and can be applied to either or both members of the fastener combination. Further, it is desirable to have the virtual pitch diameter of a corrected thread approximately equal to the basic pitch diameter.

Figure 3:
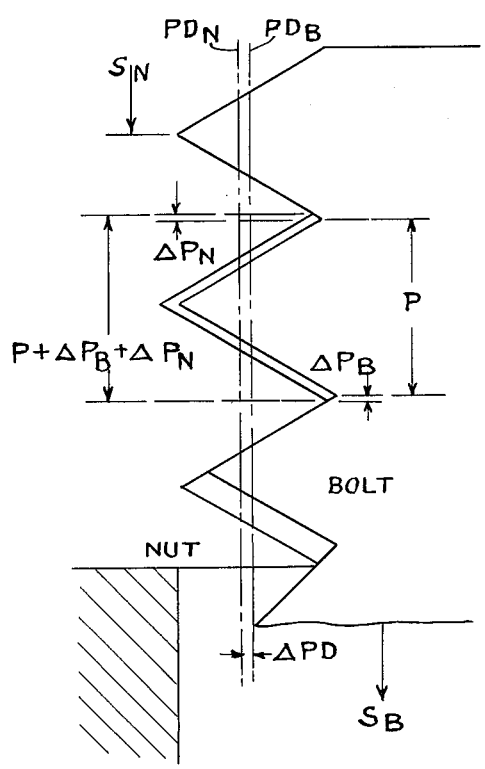
FIG. 3 is an enlarged sectional view showing the lead differential of a thread system made in accordance with the present invention.

FIG. 3 illustrates somewhat schematically a lead corrected thread system made in accordance with the present invention.

Figure 4:
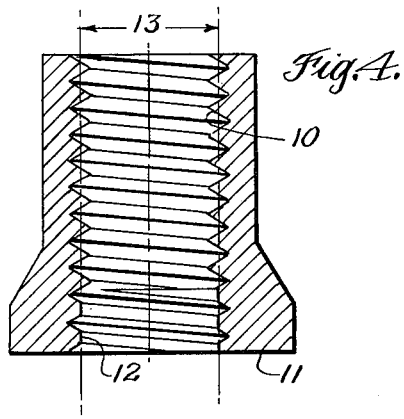
FIG. 4 is a cross sectional view of a nut in elevation employing the counterbore.
Figure 5:
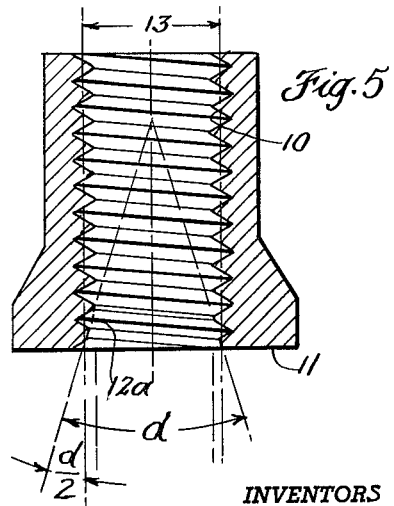
FIG. 5 shows a nut in cross section having a modified form of counterboring.

Turning now to FIGS. 4 and 5, which illustrate some special nut configurations which, when employed with the lead correction thread system as described above, will further increase the fatigue life of the external threads engaged by the nut. In FIG. 4, the internal threads 10 have a positive progressive lead correction of the type discussed in the foregoing portions of the specification.

In addition, the threads adjacent the bearing surface 11 are counterbored 12 in the general vicinity of the pitch diameter 13 so as to remove some of the metal from the threads in the area where the greatest stress concentrations occur. Preferably from 1 to 4 of the threads adjacent the bearing face are partially removed. In most applications, it is preferred to make an axial counterbore at or about the pitch diameter. The diameter of the counterbore, however, can vary within limits as determined by the following formula:

Counterbore diameter $= (B - 0.65p$
$+ \text{P.D. tolerance}) \pm 0.1p$ wherein B is the nominal major diameter, and the pitch diameter (P.D.) tolerance are those provided in "Screw Thread Standards for Federal Services—1957 Handbook H-28" (hereinafter sometimes referred to merely as "H-28"), issued by the Federal Bureau of Standards, U.S. Department of Commerce.

In FIG. 5, a modified form of counterbore is illustrated specifically this is a counterbore which starts in the vicinity of the pitch diameter and extends upwardly on a taper 12a so that an included angle (d) between the tapered walls is of the order of about 15 to 45° and preferably about 30°.

The novel thread system of the present invention can be employed in conjunction with nuts either with or without locking features. Where locks are employed they can be of the prevailing torque type locks (e.g., threads displaced to a non-circular configuration) or they can be of the castellated nut type lock. Where locking features are employed, the lead and pitch diameter corrections will not interfere with the functioning of the lock and conversely the locking features will not adversely affect the fatigue life of the fastener combination.

Lead corrected nuts with the counterbored threads increases the average fatigue life by approximately five times at specification loads. Counterboring a nut which is not "lead corrected" does not have a significant influence on the fatigue life of the bolts used with such nuts. Lead corrections alone, however, will generally double the average fatigue life of bolts used with the lead corrected nut at specification load.

The terminology employed in this application is based on definitions appearing in "Screw Thread Standards for Federal Services, 1957" Handbook H28 (1957), part 1, issued by the National Bureau of Standards.

We claim:
1. A threaded fastener including an internally threaded nut having a constant major diameter and an externally threaded bolt having a constant major diameter and a constant minor diameter, said nut being characterized in that the nut is axially counterbored to truncate the crests of from one to four nut threads adjacent the bearing face of the nut, said counterbore extending radially substantially no further than the pitch diameter of the nut, and said fastener being characterized in that the internal threads have, when in an unloaded condition, a progressively longer lead than the lead of the unloaded external threads, the lead differential being sufficient to compensate for the shortening of the lead of the internal threads and the elongation of the lead of the external threads which occurs on loading of the fastener and thereby provide for a more uniform distribution of the stress concentrations at the roots of the engaged external threads and said fastener being further characterized in that the true pitch diameters of the internal and external threads are corrected to cause the virtual pitch diameters to approach the basic pitch diameter and thereby prevent an interference fit when in an unloaded condition.

2. A fastener according to claim 1 having a 60° thread form and wherein the change in the true pitch diameter, $\Delta PD$, is computed from the following formula:

$$\Delta PD = 1.732 \times Le \times H_T$$

wherein $Le$ is the lead differential in inches per inch of thread engagement, and $H_T$ is the nut height in inches.

3. A fastener according to claim 1 wherein the true pitch diameter of the internal threads is given a positive correction to cause the virtual pitch diameter to approach the basic pitch diameter.

4. A fastener according to claim 1 wherein the true pitch diameter of the external threads is given a negative correction to cause the virtual pitch diameter to approach the basic pitch diameter.

5. A fastener according to claim 1 wherein the cross sectional areas of the internally and externally threaded members are substantially equal, the optimum lead differential being determined by the following formula:

$$Le = \frac{2(n-1)F_T}{nAE}$$

$Le$ is the lead differential in inches per inch of thread engagement, $n$ is the number of threads to carry the load, $F_T$ is the tensile load in pounds, $A$ is the average cross sectional area in square inches of the material surrounding the internal threads and $E$ is the modulus of elasticity of the internally threaded member in pounds per square inch.

6. A fastener according to claim 1 wherein the optimum lead differential is determined by the following formulae:

(1) $$Le = \frac{n_o}{n}(\Delta L)$$

(2) $$\Delta L = n(n-1)(\Delta P_B + \Delta P_N)$$

(3) $$\Delta P_N = \frac{F_T P}{n A_N E}$$

(4) $$\Delta P_B = \frac{F_T P}{n A_B E}$$

in which $Le$ is the lead differential in inches per inch of engagement, $n_o$ is the number of threads per inch, $n$ is the number of threads to carry the load, $F_T$ is the tensile load in pounds, $P$ is $1/n_o$, $A_N$ is the average cross sectional area in square inches of the material surrounding the internal threads, $E$ is the modulus of elasticity of the internally threaded member in pounds per square inch and $A_B$ is the cross sectional area in square inches of the external threads.

7. A fastener according to claim 1 wherein the diameter of the counterbore is determined by the following formula:

Counterbore diameter $= (B - 0.65p + \text{P.D. tolerance}) \pm 0.1p$ in which $B$ is the nominal major diameter of the internal thread, $p$ is the pitch of the internal threads and P.D. is the pitch diameter of the internal threads.

8. A fastener according to claim 1 wherein the counterbore is in the form of a taper starting from the nut bearing face in the general vicinity of the pitch diameter.

References Cited by the Examiner

UNITED STATES PATENTS

| | | |
|---|---|---|
| 1,909,489 | 5/33 | Eaton. |
| 1,994,132 | 3/35 | Harbridge _____ 85—32 |
| 2,059,853 | 11/36 | Daiber. |
| 2,452,192 | 10/48 | Hosking. |
| 2,770,997 | 11/56 | Hansen. |
| 2,870,668 | 1/59 | Flahaut. |
| 3,050,318 | 8/62 | Van Der Wissel _____ 151—22 |
| 3,079,181 | 2/63 | Van Der Wissel _____ 151—22 |

FOREIGN PATENTS

| | | |
|---|---|---|
| 672,946 | 5/52 | Great Britain. |

CARL W. TOMLIN, *Primary Examiner.*

EDWARD C. ALLEN, *Examiner.*